(12) United States Patent
Teetzel

(10) Patent No.: US 11,396,375 B2
(45) Date of Patent: Jul. 26, 2022

(54) MODULAR UNMANNED AERIAL SYSTEM

(71) Applicant: Wilcox Industries Corp., Newington, NH (US)

(72) Inventor: James W. Teetzel, Portsmouth, NH (US)

(73) Assignee: Wilcox Industries Corp., Newington, NH (US)

( * ) Notice: Subject to any disclaimer, the term of this patent is extended or adjusted under 35 U.S.C. 154(b) by 168 days.

(21) Appl. No.: 16/009,373

(22) Filed: Jun. 15, 2018

(65) Prior Publication Data
US 2018/0362157 A1 Dec. 20, 2018

Related U.S. Application Data

(60) Provisional application No. 62/520,370, filed on Jun. 15, 2017.

(51) Int. Cl.
*B64C 39/02* (2006.01)

(52) U.S. Cl.
CPC ...... *B64C 39/024* (2013.01); *B64C 2201/105* (2013.01); *B64C 2201/126* (2013.01)

(58) Field of Classification Search
CPC .............. B64C 2201/126; B64C 2201/105
See application file for complete search history.

(56) References Cited

U.S. PATENT DOCUMENTS

| | | | |
|---|---|---|---|
| 2003/0213869 A1* | 11/2003 | Scott | B64C 27/20 244/12.2 |
| 2014/0303814 A1* | 10/2014 | Burema | A01B 79/005 701/3 |
| 2016/0205872 A1* | 7/2016 | Chan | G05D 1/0094 |
| 2016/0214715 A1* | 7/2016 | Meffert | B64C 39/024 |
| 2018/0022310 A1* | 1/2018 | Olson | B64D 25/00 244/100 A |

\* cited by examiner

*Primary Examiner* — Jessica B Wong
(74) *Attorney, Agent, or Firm* — McLane Middleton, Professional Association

(57) ABSTRACT

A modular unmanned aerial system includes a chassis for attaching components of the modular unmanned aerial system and one or more rotary wings. Each of the one or more rotary wings is drivable by a respective motor. A central controller is provided for controlling operation of the modular unmanned aerial system. A modular interface portion attached to the chassis and adapted for removably mounting one or more modular devices.

18 Claims, 6 Drawing Sheets

& # x 2 0 ; # MODULAR UNMANNED AERIAL SYSTEM

CROSS REFERENCE TO RELATED APPLICATIONS

This application claims the priority benefit of provisional application No. 62/520,370 filed Jun. 15, 2017. The aforementioned application is incorporated herein by reference in its entirety.

BACKGROUND

The present invention relates to a modular unmanned aerial system. Existing unmanned aerial systems, such as small unmanned aerial systems or drones, employ a closed architecture design and are typically designed for a single purpose. This limitation creates logistic issues in the field if a user needs to change course, for example, during combat, to execute a new or revised mission plan.

In certain embodiments, the present disclosure contemplates a modular unmanned aerial system that provides flexibility in the combat field and minimizes the user's load in the field, especially when it is not possible to receive replacement or alternative devices. However, it will be recognized that the present disclosure also contemplates a dedicated modular unmanned aerial system configured to a specific mission.

SUMMARY

In one aspect, the present disclosure provides a modular unmanned aerial system with a main chassis and providing a plurality of interchangeable modules. Each module may be configured to carry out a different function, such that the modular unmanned aerial system is capable of performing a number of functions as well as be used and developing and executing a mission plan.

The present system is advantageous in that it allows the user to remotely change or develop a mission plan as well as remotely execute a mission plan encompassing multiple functions from a safe distance.

Another advantageous of the present system is found in that may be adapted to provide one or more dedicated or mission specific unmanned aerial systems.

Further advantages and benefits of the present development will become apparent to those skilled in the art upon a reading and understanding of the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

FIG. 9 is a perspective view of an unmanned aerial system as seen in prior art.

DETAILED DESCRIPTION OF THE PREFERRED EMBODIMENTS

Figure 1:
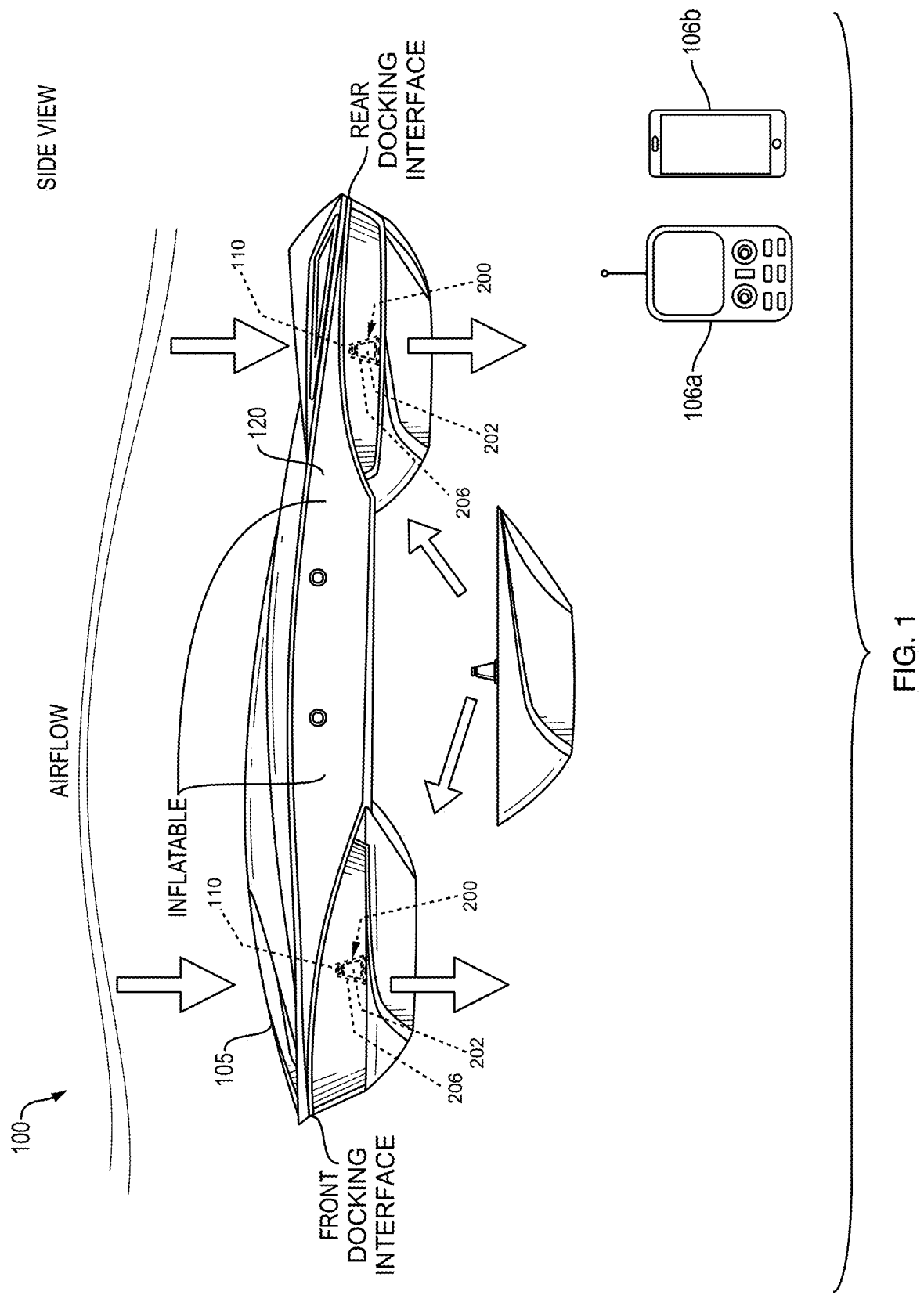
FIG. 1 is a side view of an unmanned aerial system in accordance with an exemplary embodiment.
Figure 2:
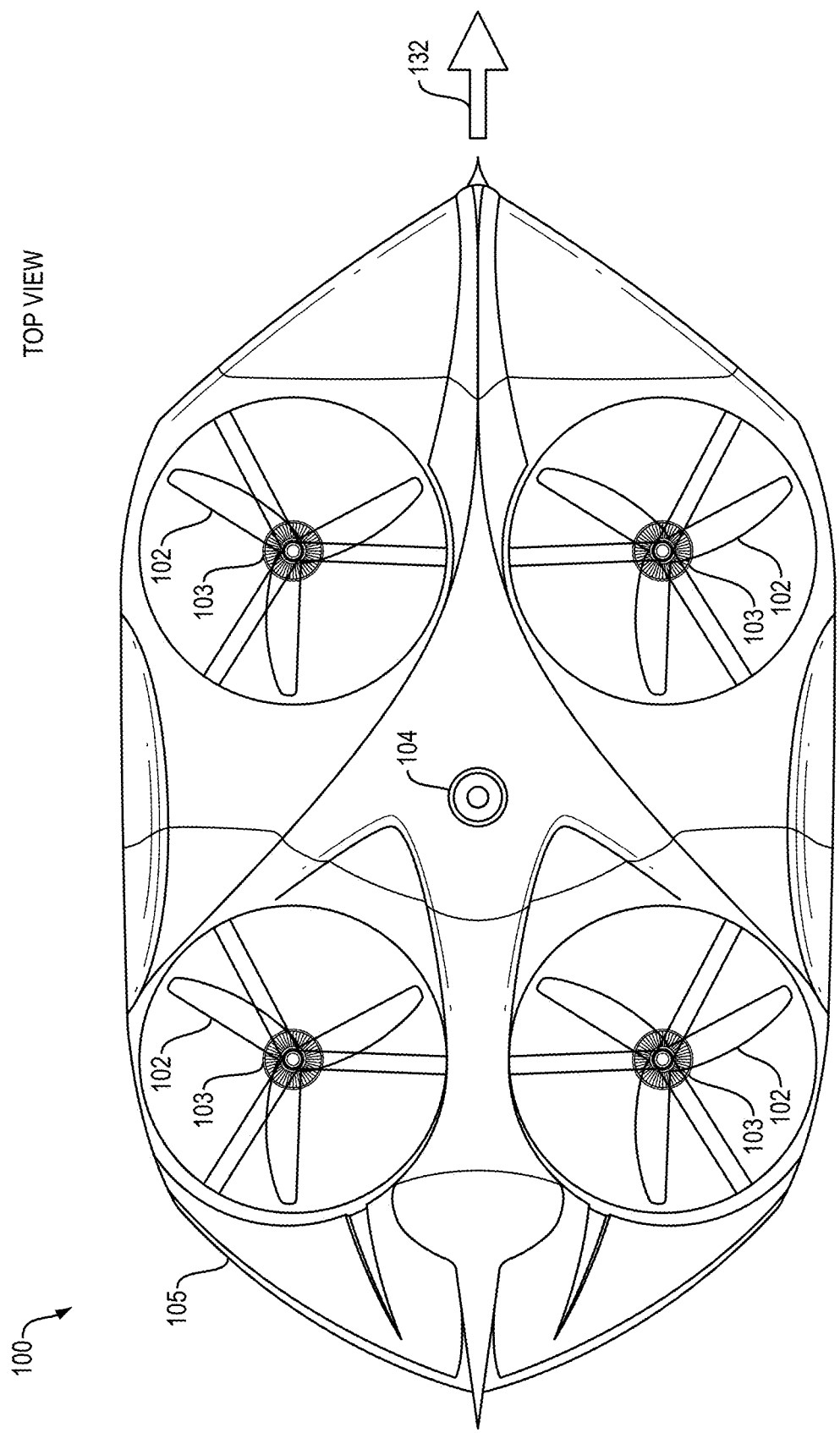
FIG. 2 is a top plan view of the unmanned aerial system of FIG. 1.
Figure 3:
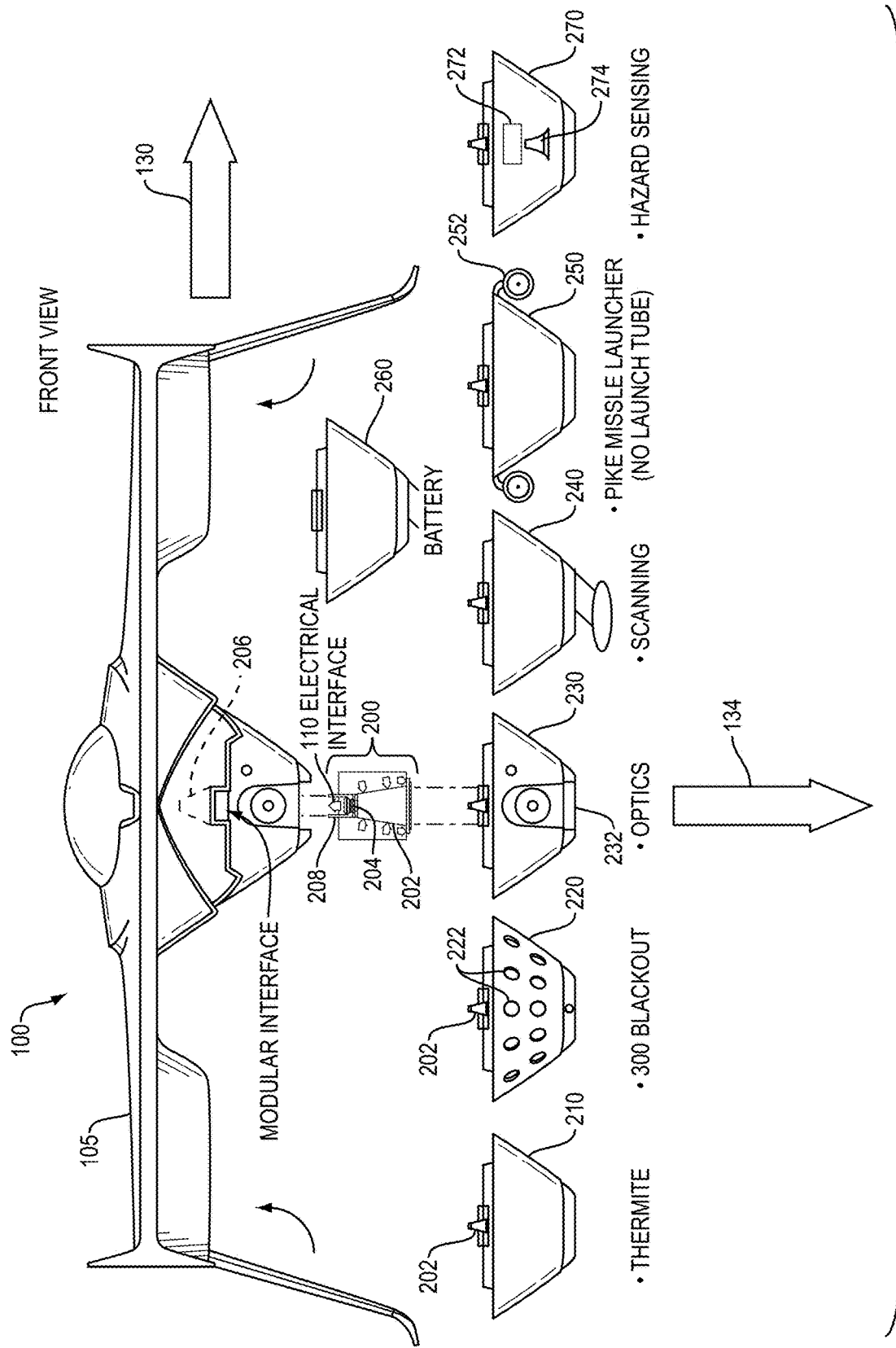
FIG. 3 is a front view of the unmanned aerial system of FIG. 1, including a plurality of exemplary interchangeable modules.

Referring now to the drawings, FIGS. 1-3 illustrate an unmanned aerial system, generally designated 100. In certain embodiments, the unmanned aerial system 100 herein takes the form of a multi-rotor drone. In certain embodiments, the unmanned aerial system 100 is a small unmanned aerial system (SUAS). The modular unmanned aerial system 100 is a flying machine or drone that is remotely piloted using a control device and includes one or more rotary wings 102 supported on a support member 105, such as a chassis, frame, fuselage, or the like. The rotary wings 102 may be driven by respective, independently controllable motors 103 so the modular unmanned aerial system 100 can be controlled in attitude, speed, and ground position. In certain embodiments, each motor 103 is controlled by a respective microcontroller which, in turn, is controlled by a central controller 104. In certain embodiments, the central controller includes an electronic memory associated therewith for storing program instructions and data. In certain embodiments, the modular unmanned aerial system 100 is a quadcopter device having four rotary wings 102.

In certain embodiments, the modular unmanned aerial system 100 includes a RADAR and/or LIDAR. The radar can be used to determine the range, altitude, direction, or speed of objects. Lidar measures distance by illuminating a target with a laser and analyzing the reflected light, thus providing accurate 3D mapping of the environment and specific objects.

In certain embodiments, the modular unmanned aerial system 100 is piloted by a piloting device, which may be dedicated remote control unit 106*a* or a hand held computing device 106*b*, including not limited to a smartphone, personal digital assistant (PDA), hand held data terminal, and so forth.

In certain embodiments, the modular unmanned aerial system 100 disclosed herein is made of advanced rapid cure composites embedded with electromagnetic interference/radio frequency interference (EMI/RFI) shielding. In certain embodiments, a continuous fiber molding process is used to create a complex contoured shape that has a low coefficient of thermal expansion, resistance to corrosion and chemical exposure, and a fuselage that is high in strength, stiffness, and low in weight compared to other plastic injection molded components. This process is lower in cost compared to traditional fabrication techniques and superior in features and benefits.

In certain embodiments, the modular unmanned aerial system 100 herein features a "Modular Payload Interface" 200 comprising a receptacle 206 positioned at the underside of the chassis 105 at the center of gravity of the modular unmanned aerial system 100. In certain embodiments, the interface receptacle 206 is configured as a female socket configured to receive a complementary male plug 202. The plug 202 includes a recess or detent 204, such as an annular groove which removably engages one or more latching members 208 within the receptacle 206. In certain embodiments, the plug 202 and receptacle 206 are generally conical in shape. It will be recognized that other connect/disconnect mechanisms are contemplated.

A standardized interface provides a so-called "open architecture" interface that allows for various interchangeable modules to be configured for quick attachment to and/or release from the chassis or fuselage. An "Electrical Interface Bus" 110 which, in certain embodiments, is waterproof or otherwise resistant to water or other contaminants such environmental or chemical contaminants, debris, etc., links signal, data, and/or power communication between the modular unmanned aerial system chassis 105 and an attached module. See FIGS. 1-3 for exemplary System Features. In certain embodiments, the modular unmanned aerial system 100 incorporates an optics module 230 such as an "Electro-Optical Gimbal Module." In certain embodiments, the modular unmanned aerial system 100 herein incorporates one or more inflatable portions 120 on the chassis 105. In certain embodiments, the chassis 105 has a side profile defining an airfoil shape configured to provide lift to the modular unmanned aerial system 100 when the modular unmanned aerial system 100 is flying in a forward direction.

In certain embodiments, one of the interchangeable modules is a "Scan Head Module" or other image scanning module 240, which includes a camera/scanner/imager for generating point cloud data (X, Y, Z) mapping coordinates. In certain embodiments, the camera is a charge-coupled device (CCD) camera.

In certain embodiments, one or more sound transducers (e.g., microphones) are provided to allow the modular unmanned aerial system 100 to detect and/or record speech or other external sounds. In certain embodiments, one or more sound emitters, including ultrasonic emitters, are provided for locating and recognizing objects, determining properties of objects, and measuring speed and distances to objects.

In certain embodiments, one of the interchangeable modules is configured for carrying a charge of a fuel/oxidizer mixture, such as thermite, designated herein as a "Thermite Module" 210. The fuel/oxidizer module 210 may also include a heat-producing component such as an incendiary charge, detonator, or the like, generating sufficient heat/temperature to initiate the thermite reaction when the Thermite Module 210 has been placed at a target location.

In certain embodiments, one of the interchangeable modules is a firearm cartridge module 220 for firing a plurality of ammunition rounds or cartridges 222. In certain embodiments, the ammunition rounds are 300 Blackout rifle cartridges.

In certain embodiments, one of the interchangeable modules is "Nacelle Hard Point Module" or other large caliber munitions module 250, configured to carry large caliber munitions such as a grenade, rocket propelled grenade (RPG), precision-guided munition (PGM), and so forth. In certain embodiments, the large caliber munition is a 40 mm munition. In certain embodiments, the munition is rocket propelled, having a small amount of propellant to discharge the munition from the launching platform before the motor ignites. In certain embodiments, the Nacelle Hard Point Module" 250 is configured to carry precision-guided miniature missile such as a PIKE™ munition developed by Raytheon.

In certain embodiments, one of the interchangeable modules is a hazard sensing module 270 for detecting and logging the position of airborne contaminants at a remote location. Exemplary contaminants include chemical, biological, and/or radiological contamination associated, for example, with military attacks, natural disasters, industrial spills, leaks, accidents, terror attacks, and so forth. The hazard sensing module allows the user identify potential airborne hazards from a remote location, map contamination/contamination levels along a flight path, allowing the user or other personnel to best plan for use of protective or mitigation measures or equipment that the user may have at his or her disposal, such as respirator masks, self-contained breathing apparatuses, protective clothing, etc.

The module 270 includes a housing having one or more chemical, biological, and/or radiological sensors 272. Such sensors include electrochemical sensors, metal oxide semiconductor sensors, spectroscopic gas sensors, and so forth. The one or more sensors 272 may include an array of sensors configured to periodically sample air along a flight path and to detect a broad range of biological and/or chemical contaminants. Alternatively, the sensor(s) 272 could be configured to sense one or a limited number of contaminants. In certain embodiments, a plurality of interchangeable hazard sensing modules 270 could be provided, each with different sensor components 272 to provide different sensing capabilities.

The hazard sensing module 270 includes at least one air intake duct 274 and may include multiple ducts, e.g., 2, 3, 4, 5, 6, 7, 8, or more, spaced around the unit 270 to permit air intake regardless of the direction in which the modular unmanned aerial system 100 is flying. In certain embodiments, the air intake duct has an airfoil-like shape configured to direct a flow of air through the ducts 274 and into the interior compartment of the sensor module 270 where it impinges on the one or more sensors 272. The airflow directing surfaces 16 may configured as a so-called submerged inlet, NACA duct or NACA scoop, or other low drag air inlet configured to allow air to flow into the ducts 274 where it contacts the one or more sensors 272.

In certain embodiments, the sensor output signals are processed using signal processing electronics within the module 270 to provide a digital representation of sensed contamination information. Alternatively, the sensor output signals may be sent to processing electronics within the chassis 105 for processing to provide a digital representation of sensed contamination information. In either instance, the digital representations of sensed contamination information may be logged in an electronic storage medium. Sensed contamination information may include one or more of contaminant type, composition, and concentration information. In certain embodiments, the sensed contamination information is logged in association with time and/or position information. The sensing components and time and/or position logging may be as described in commonly owned U.S. Pat. No. 9,964,386, issued May 8, 2018 (Ser. No. 14/792,961 filed Jul. 7, 2015), the entire contents of which are incorporated herein by reference.

In certain embodiments, the position information is satellite positioning system information, such as GPS information or the like, although other methods of determining position, such as the use of an inertial positioning system, are also contemplated. In operation, the sensor(s) 272 senses the presence and/or concentration of airborne contaminants during flight and store the sensed contamination information in connection with the positional coordinates of where the device 100 flew, and where contaminating agents were or were not found, and optionally, at what levels and/or at what times.

In certain embodiments, once the unit returns to the docking station, the logged information is downloaded to a further computer based information handling system, such as a centralized system, networked system, or the like.

In certain embodiments, the logged data is used to generate a report of flight data, including, for example, the flight path, a histogram of data, or a GPS map showing sensed contamination information. The logged data may be combined with data from like devices 100, for example, from different geographical areas to expand the geographical coverage of the contamination map and/or from the same or overlapping geographical area at different times to provide dynamic mapping to show changes in contaminants and/or contaminant levels over time.

The present system is advantageous in that it allows the user in combat to adapt to new emerging threats and creates a safe standoff distance between the user and the enemy, running complex missions remotely and keeping the user at a safe fighting distance.

In certain embodiments, the modular unmanned aerial system 100 is configured for use in a GPS-denied environment, which prevents the enemy from using homegrown drones equipped with a GPS receiver, and carrying offensive weapons, against the user during these operations.

In certain embodiments, the present system utilizes lightweight and highly oriented aerospace grade carbon fiber composites to create a fuselage structure that is durable. In certain embodiments, the fuselage structure is geometrically faceted to produce a low radar signal yet remain aerodynamic (See FIGS. 1 and 3).

In certain embodiments, engineered design features lock upper and lower fuselage sections to the chassis 105 which is preferably formed of a metal/metal alloy although other materials are contemplated such as polymer materials, reinforced (e.g., fiber reinforced) polymer composite materials, etc.) The chassis serves as a mounting platform for electronic components and provides structural reinforcement. In certain embodiments, the chassis 105 is formed of a thermally conductive material (including metal/metal alloy or a thermally conductive polymer material) and serves as a low profile heat sink, allowing the internals to be sealed and still disperse heat naturally to the outside of the modular unmanned aerial system 100 during forward flights increasing electronics performance and allow for "Multi-Robot Teaming".

The features of an exemplary modular unmanned aerial system 100 in accordance with a preferred embodiment of the invention appear in Table 1.

TABLE 1

| | modular unmanned aerial system EXEMPLARY FEATURES |
|---|---|
| 1 | Lithium polymer battery |
| 2 | AC/DC source charging capable |
| 3 | Selective Availability Anti-Spoofing Module (SAASM)/M-CODE System Capable |
| 4 | One System Remote Video Terminal (OSRVT) Transmit/Receive Decoding Video Capable |
| 5 | Tracking stationary and mobile target capable, or assigned waypoints designated by the operator with the electro-optical/infrared (EO/IR) camera payload is optional. |
| 6 | Navigation modes include fully-autonomous (O), semi-autonomous (O) and manual mode (T) |

TABLE 1-continued

| | modular unmanned aerial system EXEMPLARY FEATURES |
|---|---|
| 7 | Gimbal camera systems optional, with second option to have a fixed angle camera on the top of the drone. Able to meet the color daylight video, night (passive infrared) video (≥640 x 480) and high resolution still imagery (≥5 Megapixels), selectable during the mission to the GCS display. |
| 8 | Accommodates integrated and modular payloads including digital zoom day/night EO/IR cameras. System will have laser illuminator and near IR laser marker supported Modular Payload Interface 200 and Electrical Interface Bus 110. |
| 9 | Option-based system with a choice of programmable mission based executables. |
| 10 | Features include a remote activated/deactivated dual function IR/Visual strobe |
| 11 | Sealed components designed to survive 0.50 in/hr. |
| 12 | To meet the inaudible acoustic signature at an autonomous steady state cruise at 200 ft AGL with a background noise of 65 dBA, 100 ft AGL/35 dBA |
| 13 | Includes a locator transmitter with remote activation/deactivation before launch, during flight, and after UA recovery. |
| 14 | Optional gimbal mount required to meet TLE of 25 m, 10 m on the ground, or while airborne with a slant range of 0 to 250 AGL with GPS |
| 15 | Capable of providing remote camera operation to exceed 60 min perch/stare |
| 16 | Optional controller, including storage capacity for video in certain embodiments |
| 17 | System is capable of operating in a GPS-denied environment |
| 18 | Meets 15 CM of target autonomous precision landing |
| 19 | System is capable of autonomous following of a soldier or vehicle at 0 mph or greater. |

Certain exemplary embodiments of mission-specific modules are described below; however, it will be recognized that the present development could be adapted for use with alternative modules as may be useful for different missions or objectives.

The optics module 230 (e.g., Electro-Optical Gimbal Module) as described in the table above. In certain embodiments, the gimbal camera 232 is rotatable about a pitch axis 130 of the modular unmanned aerial system 100, preferably about 180 degrees. In certain embodiments, the gimbal camera 232 is rotatable a roll axis 132 of the modular unmanned aerial system 100, preferably about 180 degrees. In certain embodiments, the gimbal camera 232 is rotatable about a yaw axis 134 of the modular unmanned aerial system 100, preferably about 360 degrees. In certain embodiments, the gimbal camera is rotatable about any one or more of the pitch axis 130, roll axis 132, and yaw axis 134. In certain embodiments, the gimbal camera is rotatable about 180 degrees about the pitch axis 130, 180 degrees about the roll axis 132, and 360 degrees about the yaw axis 134.

The fuel/oxidizer module 210 (e.g., Thermite Module) is deployable to designated targets by means of the "Modular Payload Interface" release mechanism. The fuel/oxidizer module may be remotely ignited.

The firearm cartridge module 220 (e.g., 300 Blackout Module) houses multiple (e.g., ten) 300 Blackout bullets/cartridges 222 that can be fired independently or in groupings. The bullets are lightweight, cause less recoil, and have improved stopping power at a short range.

The large caliber munitions module 250 (e.g., Nacelle Hard Point Module) is configured to carry a Raytheon PIKE™ missile 252 launched from the modular unmanned aerial system 100 typical of how an Air-to-Ground Missile is launched from a fighter jet. The guidance head may be Point cloud based defining an X, Y, Z point in space.

Figure 4:
FIG. 4 is an exemplary aerial map as may be employed by the unmanned aerial system of FIG. 1.
Figure 5:
FIG. 5 is an exemplary point cloud data image as may be generated by the unmanned aerial system of FIG. 1.

Referring now to the scanning module 240 (e.g., Scan Head Module), one way to defeat a threat is to create a weapon delivery system that allows one to build a mission, pin point target(s) of opportunity, all in a GPS-denied landscape. In certain embodiments, the scanning module 240 is capable of accessing Google or other online aerial maps, for example, as illustrated in FIG. 4). In certain embodiments, the present system uses an application (app) running on a computer-based system, such as a tablet, laptop, smartphone, PDA or other portable computer system, to access and utilize the aerial map and tutorially guide the user through a mission planning process (e.g., through a series of guided or interactive prompts, menu interfaces, windows, software "wizard" type interface, touch screen interface, etc.). In certain embodiments, the flight plan can be derived by pointing and clicking potential target(s) on the aerial map and defining points of interest used to develop a "Mission Plan." A program of instructions is generated to cause the modular unmanned aerial system 100 to then fly the flight plan and create a point cloud data picture (see FIG. 5).

Figure 6:
FIG. 6 is an exemplary image of an aerial view of vehicles as may be employed in targeting by the unmanned aerial system of FIG. 1.
Figure 7:
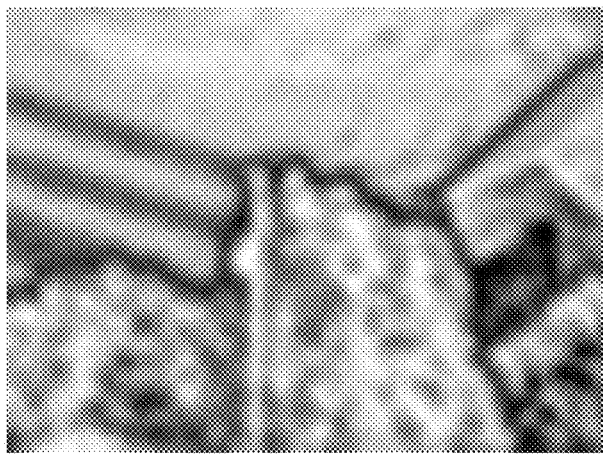
FIG. 7 is an exemplary image of an aerial view of power lines as may be employed in targeting by the unmanned aerial system of FIG. 1.
Figure 8:
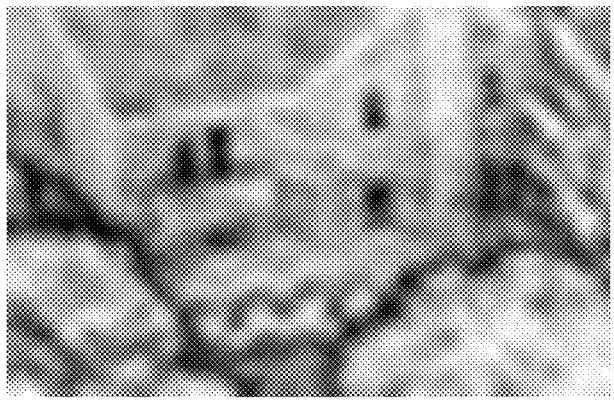
FIG. 8 is an exemplary image of an aerial view of a building as a structure of interest as may be employed in targeting by the unmanned aerial system of FIG. 1.

Exemplary target points where picked and defined are shown in FIGS. 6-8. For example, FIG. 6 is an image showing potential target vehicles whereby one or more Thermite Modules 210 are deliverable to each vehicle's hood. As shown in the image appearing in FIG. 7, a power line going to a structure of interest may be selected as a target in order to disable power to the structure. FIG. 8 illustrates an example of an aerial view for pinpointing X, Y, Z values such as a window or door of a structure to program the Raytheon PIKE™ missile(s) without requiring the need to laser designate the target. In this manner, the tablet, e.g., having a touch screen interface, allows the user to manage a coordinated and synchronized assault in executing the Mission Plan, while the user is positioned at a safe distance away. In certain embodiments, it is contemplated that the "Scan Head Module" 240 may be operated using the app wherein the flight control system of the modular unmanned aerial system 100 is synchronized to the scanner interface module 240. In certain embodiments, flight plans may be stored and repeated for future missions.

In certain embodiments, the modular unmanned aerial system 100 is configured to return to a "home" docking station and drop off a module automatically under preprogrammed control once the attached module is no longer needed and to pick up another module. In this manner, the modular unmanned aerial system 100 herein will self-replenish itself (i.e., drop off a module that is no longer needed and pick up the next module), e.g., in accordance with a given "flight plan" or "mission plan." In certain embodiments, the modular unmanned aerial system 100 is additionally or alternatively configured to return to the operator wherein modules can be interchanged manually.

In certain embodiments, the power supply 260, which may be one or more batteries or battery packs, is contained within the fuselage 105. The power supply may be rechargeable or non-rechargeable. In certain embodiments, the power supply (whether rechargeable or non-rechargeable) 260 may be disposed within a battery compartment which is manually accessible, e.g., having a removable battery compartment cover, to allow the user to manually replace the power source. In certain embodiments, the power supply 260 may be a removable module. In certain embodiments, the modular unmanned aerial system includes charging contacts wherein the modular unmanned aerial system 100 is connected to a charging dock to charge the power supply 260. In certain embodiments, the power supply 260 includes charging contacts wherein the power supply is connected to a charging dock to charge the power supply 260. In certain embodiments, the modular unmanned aerial system 100 is configured to be placed manually on the charging dock for recharging. In certain embodiments, the modular unmanned aerial system 100 herein is configured to guide itself under programmed control to connect with a charging dock for recharging the power source 260.

In certain embodiments, each interchangeable functional module may contain a power supply that provides power to operate the modular unmanned aerial system 100.

In certain embodiments, a second docking interface 200 including a plug 202, receptacle 206, and electrical interface 110 as described above, is provided on the modular unmanned aerial system 100 for interchangeably attaching battery module 260. The second docking interface 200 allows, for example, a depleted battery module to be replaced with a charged battery module. The second docking interface 200 is separate from and independent of the first, docking interface 200 for attaching the various functional or mission-specific modules as described above. In certain embodiments, the modular unmanned aerial system 100 processing electronics monitor the power level of the battery module and is configured to fly back to a battery hive or other pre-specified location when it needs a new one. In certain embodiments, the modular unmanned aerial system 100 is configured to return to the operator to manually exchange battery modules.

In certain embodiments, the modular unmanned aerial system 100 herein is configured to guide itself under programmed control to connect with a docking station to drop off a battery module that needs recharging (including placing the battery on a charging dock in the battery hive) and to pick up a fully charged battery module.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims and their equivalents.

What is claimed is:

1. A modular unmanned aerial system comprising:
   a chassis for attaching components of the modular unmanned aerial system;
   one or more rotary wings, each of the one or more rotary wings drivable by a respective motor;
   a central controller for controlling operation of the modular unmanned aerial system;
   a plurality of interchangeable modules selected from the group consisting of a payload module carrying a charge of a fuel/oxidizer mixture, a firearm cartridge module, an optical module, a scanning module, a large caliber munitions module, and a hazard sensing module;
   a first docking interface attached to the chassis and adapted for removably and interchangeably attaching each of the plurality of interchangeable modules; and
   a second docking interface attached to the chassis and adapted for removably attaching a first battery module, the first battery module interchangeable with a like battery module when the first battery module is depleted.

2. The modular unmanned aerial system of claim 1, wherein the first docking interface includes a receptacle on an underside of said chassis configured to removably receive a complementary connecting member on the plurality of interchangeable modules.

3. The modular unmanned aerial system of claim 1, wherein the first docking interface is disposed at the center of gravity of the modular unmanned aerial system.

4. The modular unmanned aerial system of claim 1, further comprising an electrical interface for operably electrically connecting the first battery module to an attached one of the plurality interchangeable modules.

5. The modular unmanned aerial system of claim 1, further comprising an electrical interface for operably electrically connecting the first battery module to an electrical circuit in the chassis.

6. The modular unmanned aerial system of claim 1, wherein said central controller is configured to operably communicate with the plurality of interchangeable modules when attached to the first docking interface.

7. The modular unmanned aerial system of claim 1, wherein the optical module includes a camera attached to a gimbal rotatable about a yaw axis in the modular unmanned aerial system.

8. The modular unmanned aerial system of claim 1, wherein the payload module includes thermite.

9. The modular unmanned aerial system of claim 1, wherein the firearm cartridge module includes a plurality of ammunition rounds.

10. The modular unmanned aerial system of claim 1, wherein the central controller includes a flight control system.

11. The modular unmanned aerial system of claim 10, wherein the plurality of interchangeable modules includes the scanning module and wherein the flight control system is configured to be communicatively coupled with the scanning module.

12. The modular unmanned aerial system of claim 10, wherein the flight control system is configured to operate in a GPS-denied environment.

13. The modular unmanned aerial system of claim 1, wherein the large caliber munitions module includes one or more large caliber munitions.

14. The modular unmanned aerial system of claim 13, wherein the one or more large caliber munitions is selected from the group consisting of a grenade, a rocket propelled grenade, and precision guided munition.

15. The modular unmanned aerial system of claim 1, wherein the large caliber munitions module forms a nacelle hardpoint.

16. The modular unmanned aerial system of claim 1, wherein the hazard sensing module includes a sensor for sampling airborne contaminants along a flight path.

17. The modular unmanned aerial system of claim 1, further comprising an electronic memory associated with the central controller for storing one or both of program instructions and data.

18. The modular unmanned aerial system of claim 1, further comprising one or more inflatable portions on the chassis.

* * * * *